(12) United States Patent
Eckardt et al.

(10) Patent No.: US 6,807,643 B2
(45) Date of Patent: *Oct. 19, 2004

(54) METHOD AND APPARATUS FOR PROVIDING DIAGNOSIS OF A PROCESSOR WITHOUT AN OPERATING SYSTEM BOOT

(75) Inventors: Donald J. Eckardt, Beaverton, OR (US); David C. Stewart, Beaverton, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/469,249

(22) Filed: Dec. 22, 1999

(65) Prior Publication Data

US 2003/0163765 A1 Aug. 28, 2003

Related U.S. Application Data

(63) Continuation-in-part of application No. 09/221,575, filed on Dec. 29, 1998, now Pat. No. 6,272,629.

(51) Int. Cl.$^7$ ............................................. G06F 11/00
(52) U.S. Cl. ............................................. 714/36; 713/2
(58) Field of Search ............................ 714/36, 23, 29, 714/37; 713/2

(56) References Cited

U.S. PATENT DOCUMENTS

| | | | | |
|---|---|---|---|---|
| 5,390,324 A | * | 2/1995 | Burckhartt et al. | 714/23 |
| 5,455,933 A | * | 10/1995 | Schieve et al. | 710/72 |
| 5,491,790 A | * | 2/1996 | Keeley et al. | 714/36 |
| 5,491,804 A | * | 2/1996 | Heath et al. | 710/10 |

(List continued on next page.)

FOREIGN PATENT DOCUMENTS

| | | | | |
|---|---|---|---|---|
| JP | 07295670 A | * | 11/1995 | G06F/1/00 |
| JP | 10161900 A | * | 6/1998 | G06F/11/22 |

OTHER PUBLICATIONS

Ron White, "How Computers Work", Sep. 1999, Que, Millenium Edition, pp. 17–19.*

(List continued on next page.)

Primary Examiner—Scott Baderman
Assistant Examiner—Gabriel Chu
(74) Attorney, Agent, or Firm—Kenyon & Kenyon

(57) ABSTRACT

A method and apparatus are provided for diagnosis of a processor in an operating system-absent environment (i.e., without or prior to an operating system boot). A boot operation of the processor is begun, and a Power-On Self test (POST) process is run. If a failure in the POST process occurs, the failure is detected and information regarding it is stored. The processor is then rebooted and the POST process is begun again. The stored information of the prior POST failure is then used for diagnosis during the reboot operation. To assist in the diagnosis, information about the state of the boot process can be displayed as a supplement to beep codes customarily used for diagnosis. In another aspect of the invention, after a boot failure is detected, a Pre-boot Diagnostic System Loader can be run. Information stored in the Pre-boot Diagnostic System Loader can then be used to boot a diagnostic partition. Also, in order to permit diagnosis and repair by establishing connection with a remote location, a voice connection and a network connection can be separately established between the processor and the remote location on separate lines. The voice connection and the network connection can then be correlated with one another by using a Lightweight-Directory-Access-Protocol (LDAP) database which stores information to permit the correlation. Once the correlation is established, diagnosis and remote repair can be achieved. All of these operations can be run in the OS-absent environment.

11 Claims, 6 Drawing Sheets

U.S. PATENT DOCUMENTS

| | | | | |
|---|---|---|---|---|
| 5,537,540 | A | * | 7/1996 | Miller et al. .................... 714/36 |
| 5,543,727 | A | * | 8/1996 | Bushard et al. ........... 324/158.1 |
| 5,583,987 | A | * | 12/1996 | Kobayashi et al. ............ 714/11 |
| 5,884,073 | A | * | 3/1999 | Dent ........................... 709/222 |
| 5,974,546 | A | * | 10/1999 | Anderson ...................... 713/2 |
| 6,014,744 | A | * | 1/2000 | McKaughan et al. ........ 713/100 |
| 6,035,420 | A | * | 3/2000 | Liu et al. ...................... 714/25 |
| 6,170,055 | B1 | * | 1/2001 | Meyer et al. ................... 713/2 |
| 6,230,285 | B1 | * | 5/2001 | Sadowsky et al. ............ 714/14 |
| 6,272,629 | B1 | * | 8/2001 | Stewart ....................... 709/222 |
| 6,381,694 | B1 | * | 4/2002 | Yen ............................... 713/1 |
| 6,393,559 | B1 | * | 5/2002 | Alexander ...................... 713/2 |
| 6,393,586 | B1 | * | 5/2002 | Sloan et al. .................... 713/1 |
| 6,449,735 | B1 | * | 9/2002 | Edwards et al. .............. 714/25 |

OTHER PUBLICATIONS

"Logging of Power–On Self–Test Errors", IBM Technical Disclosure Bulletin, Nov. 1990, vol. 33, iss. 6A, pp. 340–342.*

"Logging and Retrieving of Error Codes", IBM Technical Disclosure Bulletin, Jan. 1989, vol. 31, iss. 8, pp. 265–266.*

* cited by examiner

METHOD AND APPARATUS FOR PROVIDING DIAGNOSIS OF A PROCESSOR WITHOUT AN OPERATING SYSTEM BOOT

CLAIM FOR PRIORITY

This is a continuation-in-part (CIP) application from an application for "Method And Apparatus For Establishing Network Connection For A Processor Without An Operating System Boot" filed in the United States Patent & Trademark Office on Dec. 29, 1998, assigned Ser. No. 09/221,575, now issued as U.S. Pat. No. 6,272,629.

FIELD OF THE INVENTION

The present invention relates to diagnosing problems in a processor which occur during an operating system boot.

BACKGROUND OF THE INVENTION

A significant area of concern in the computer industry involves how best to provide for management of computers, including, for example, providing maintenance. A big problem with personal computers (PCs) today is that they are perceived to be hard to use by a majority of non-PC owners (and even many PC owners). In one particular example, when PCs have problems, they produce cryptic behavior and require a high level of expertise to fix. One of the ways ease of use can be improved on PCs is to make them either self-diagnosing or to enable them to be diagnosed remotely by a support technician.

In the past, it has been common to provide service contracts for personal visits by repair personnel to maintain and repair computer equipment. Obviously, this is an expensive and time consuming approach.

Accordingly, significant efforts have been made toward providing remote management for computers to eliminate the need for such personal service calls.

In Local-Area-Networks (LANs), systems such as the Intel Wired-for-Manageability (WfM) have been developed to perform diagnosis and repair without the need for personal service calls. However, such systems are generally not readily adaptable to so-called "occasionally connected" computers (e.g., consumer personal computers (PCs), corporate desktops in remote branch offices, unattended servers in branch offices, mobile platforms, etc.). In the past, such occasionally connected computers have been remotely serviced and/or updated by connection over a public network, such as the Internet. However, such remote management operations require the operating system of the computer to be booted in order to establish a modem connection over the network. In many cases, this is impractical because the nature of the problem which the computer is experiencing occurs during the boot process and prevents booting the operating system. Accordingly, a significant need exists for an arrangement that can permit diagnosis and repair of a processor without the requirement for an operating system boot, especially in the area of occasionally connected computers.

U.S. Ser. No. 09/221,575 filed by David C. Stewart, one of the co-inventors of the present application, on Dec. 29, 1998 discloses a method and apparatus which permits establishing a network connection for a processor without an operating system boot. In this arrangement, pre-boot services are loaded into a volatile memory of the processor from a nonvolatile memory. These pre-boot services include code for a modem driver. The modem driver code is then used to establish the network connection. This permits remote diagnosis and repair (as well as updating) even when the processor will not boot, not only in Local-Area-Networks (LANs) such as the Intel Wired-for-Manageability (WfM), but also in the so-called "occasionally connected" computers. As such, the arrangement disclosed in Ser. No. 09/221,575 provides a good starting point for developing methods and systems that are capable of both self-diagnosis and remote repair functions. The present invention is directed to further developments of the disclosure set forth in Ser. No. 09/221,575.

SUMMARY OF THE INVENTION

A method and apparatus is provided in accordance with the present invention to provide diagnosis of the processor. To this end, a boot operation is begun and a Power-On-Self-Test (POST) operation is run as part of the boot operation. During the POST operation, failures in the POST operation are detected. Information is then stored about such failures, and the processor is rebooted. During the reboot operation, the stored information of the prior POST failure is then used for diagnosis.

DETAILED DESCRIPTION OF THE INVENTION

FIGS. 1–4 show flowcharts of operations which occur using the present invention during a boot process. In particular, FIGS. 1–4 illustrate an operation which sets a flag to indicate a POST error during a boot process, followed by rebooting and using what was learned in the earlier boot attempt to help diagnose and repair the problem during the reboot operation. As can be seen, these flowcharts in FIGS. 1–4 include both self-diagnosis and remote repair, depending on the situation encountered.

Figure 1:
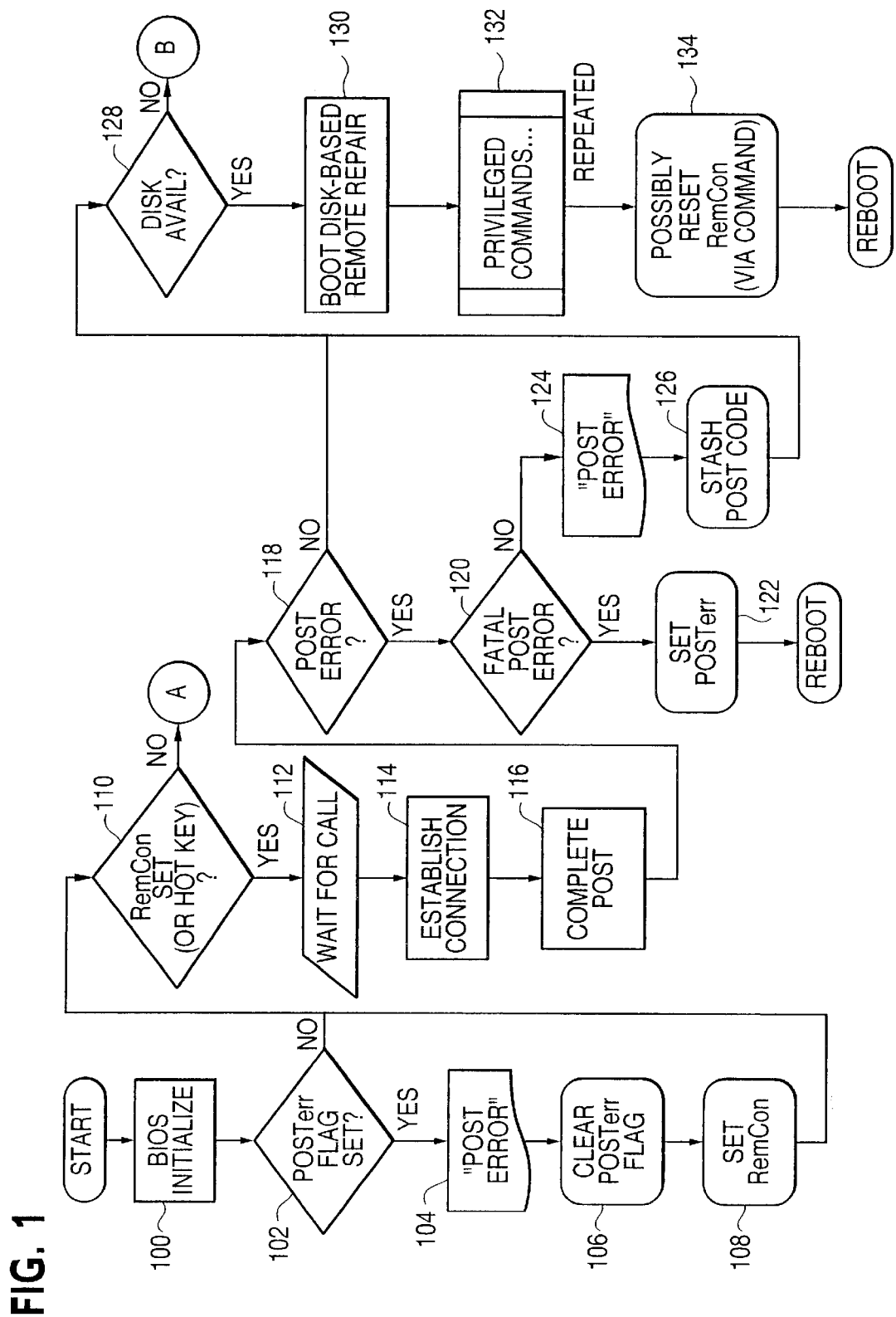
FIGS. 1–4 are flowcharts showing operation of a processor in accordance with the present invention.

Referring to FIG. 1, the operation starts with a standard Basic-Input-Output System (BIOS) initialization step 100. In step 102, it is determined whether a POST error flag has been set from a previous boot attempt. If a POST error flag has been set in a previous boot attempt, a display is provided in the processor indicating "POST error" in step 104. The flag is then cleared in step 106 and a remote connection instruction RemCon is set for connection to a remote repair facility in step 108. Step 110 determines whether such a remote connection instruction RemCon has been set, or, alternatively, whether the user has made a manual request (for example, with a hot key) for such a remote connection to a remote repair facility. As can be seen in FIG. 1, if no POST error flag is set from a previous boot attempt, the system will proceed directly from step 102 to step 110.

Figure 2:
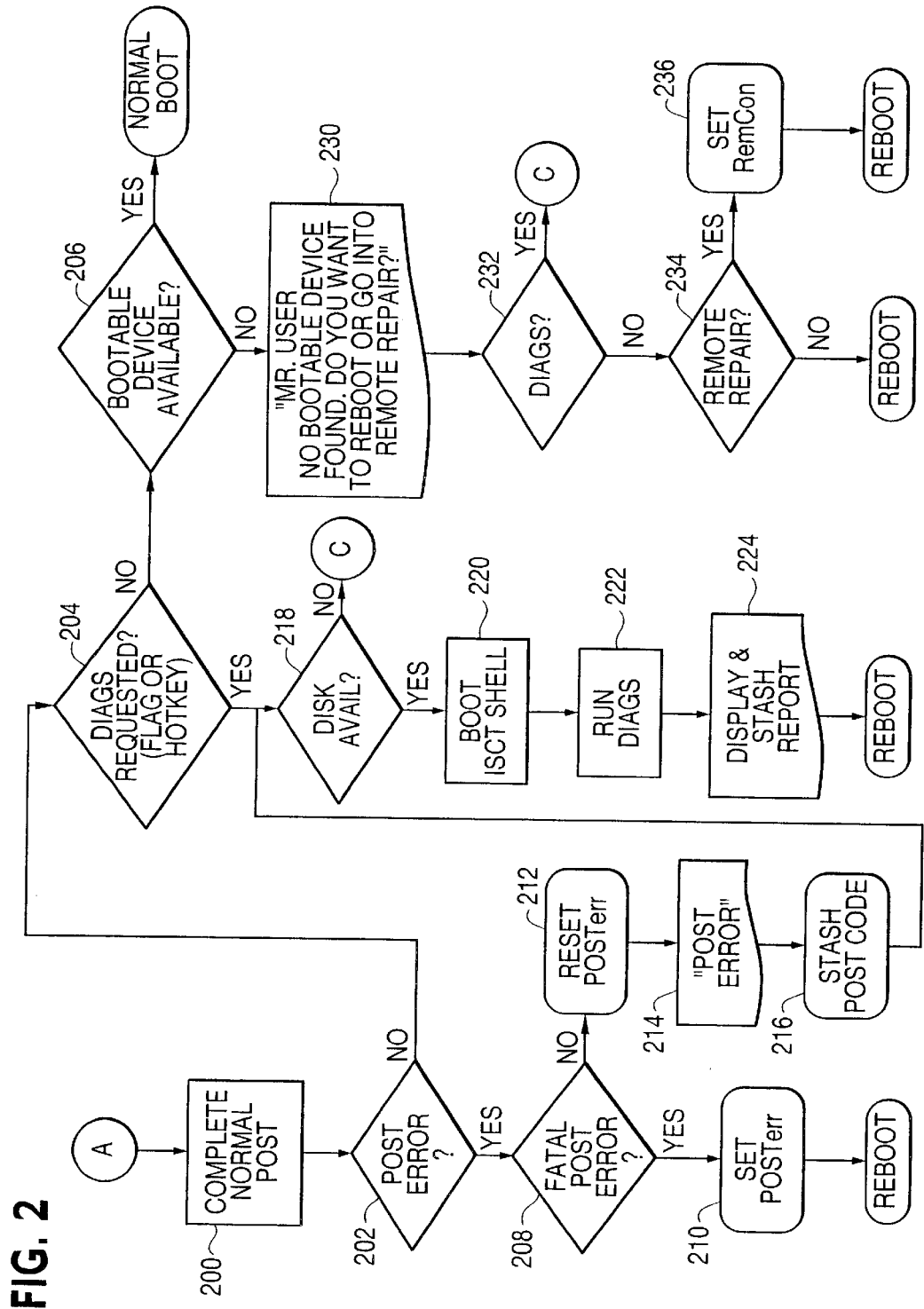

If step 110 determines that neither a remote connection instruction nor a hot key request have been set, program A is initialized (see FIG. 2). In program A, the normal POST operation is carried out in step 200. In self-diagnosing step 202, it is determined whether a fatal POST error is detected during step 200. If no fatal POST error is detected, step 204 checks whether diagnosis has been manually requested either by a flag or by a hot key. If no diagnostics have been requested, step 206 checks to see if a bootable device is available. For example, a self-diagnosis check is made to determine if a proper Master Boot Record (MBR) exists, as will be discussed hereinafter. If a bootable device is available in step 206, a normal boot operation is carried out.

If step 206 determines that no bootable device is available, a message 230 is displayed indicating that no bootable device was found, and allowing the user to select a remote repair session, run diagnostics or attempt a reboot. Step 232 determines whether self-diagnostics are to be instituted in the processor itself as a result of the user prompt in step 230. If so, program C is initiated (see FIG. 4).

Figure 4:
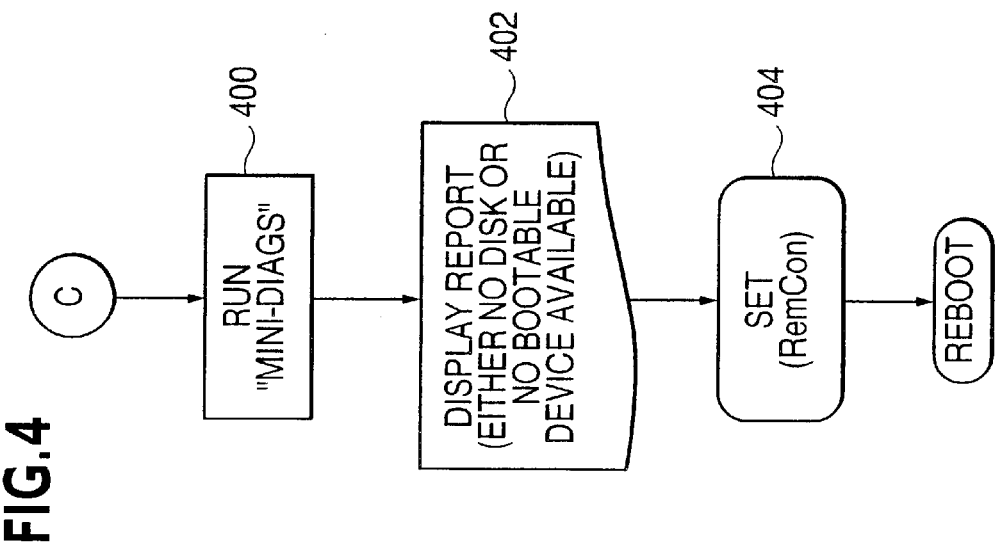

Referring to FIG. 4, step 400 first runs a self-diagnostic "Mini-Diags" operation. Step 402 then displays a report indicating "Either no disk or no bootable device available." Step 404 then determines whether a remote connection instruction should be set. Such a remote connection instruction will be used in a reboot operation to establish connection with a remote repair facility. Specifically, during the reboot operation, step 110 will recognize the remote connection instruction set by step 404 and establish connection with a remote repair facility, as will be discussed below. On the other hand, if the diagnostic step 400 has been successful in repairing the problem, there is no need to set the remote connection instruction. In this case, the processor will reboot with the repair having been made and proceed through a normal boot operation.

If the outcome of step 232 is that self-diagnosis is not to be initiated (as result of the prompt in step 230), a determination is made in step 234 as to whether a remote repair should be attempted. If so, a remote connect instruction is set in step 236, and the processor will then be rebooted. In this case, the remote connection instruction will be recognized in step 110 in the reboot operation to institute a remote repair operation. On the other hand, if step 234 determines that no remote repair connection is to be made, the system will simply reboot.

On the other hand, if step 202 determines that there is a POST error, for example, an error in the Peripheral Component Interface (PCI) sizing, as will be discussed hereinafter, step 208 determines if the error is a fatal one. This determination may be made by looking up a failure code in a table of fatal error codes. If the error is fatal, the POST error flag is set in step 210, and the system is rebooted. In setting the flag in step 210, the nature of the POST error is indicated, as will be discussed hereinafter. This information can then be used in the subsequent reboot operation. With regard to this, the flag set in step 210 will be recognized in the reboot operation by the step 102.

If step 208 determines that the POST error is not fatal, step 212 will also set a POST error flag noting the nature of the non-fatal POST error, a message will be displayed to the user that a POST error occurred in step 214, and a POST error code will be stashed in step 216. By virtue of the fact that a non-fatal POST error exists, step 218 will check as to whether a disk is available. This is performed by a check in the system BIOS. If a disk is available, step 220 will boot an Intel Service Connect Technology (ISCT) shell (a extensible method of running diagnostics), step 222 will run diagnostics to try to correct the non-fatal error, and step 224 will provide a display regarding the results of the diagnostic operation and stash a report regarding it. Then the system will reboot. During the reboot operation, the information regarding the non-fatal POST error will be recognized in step 102 from the flag set by step 212, and this information can be used to carry out the reboot operation. Returning to step 218, if no disk is available, program C is initiated. Regarding this, reference should be made to the previous discussion of program C referring to FIG. 4.

Returning to FIG. 1, the remote repair operation will now be described. As can be seen in FIG. 1, the remote repair operation is initialized by a positive response to the query in step 110 as to whether a remote connection instruction has been set or a hot key has been activated.

In either case, a call is placed in step 112, a connection with a remote repair facility is established in step 114, and the POST operation is completed and evaluated by the remote repair facility in step 116. Step 118 then determines whether a POST error is detected or not.

If a POST error is detected in step 118, it is then checked in step 120 as to whether the POST error is a fatal one. This determination is made in a manner similar to step 208. If the error is determined to be fatal, a POST error flag is set in step 122, indicating the nature of the POST error. The processor will then reboot. During the reboot operation, the POST error flag will be recognized by step 102 and information about the nature of the POST error will be used in either setting diagnostic operations or remote repair operations to implement a repair in the reboot operation.

If step 120 detects that the POST error is not fatal, an indication of "POST error" is displayed in step 124, and a code for the POST error is stashed in step 126. This stashed code can be used in subsequent diagnosis or repair operations.

Next, step 128 performs a self-diagnosis operation to determine if a disk is available. As shown in FIG. 1, if the response to step 118 checking for a POST error is a negative response (i.e., no POST error), then the program proceeds directly to step 128. Step 128 can include a determination as to whether a boot disk with a proper Master Boot Record (MBR) is available.

If step 128 determines that a disk is available, a boot disk-based remote repair operation is implemented in step 130. Regarding this, it should be kept in mind that the steps leading up to step 128 are premised on a determination in step 110 that either a request for a remote connection to a remote repair facility has been set or a hot key requesting repair has been activated by the user. In accordance with step 130, a series of privileged commands are carried out in step 132 and repeated as necessary for repair purposes. Following the repair operation, if it is determined to be necessary, the remote connection instruction can be reset via a command from the remote repair facility in step 134. The system then reboots to try to establish a normal boot based on the remote repairs that have been made.

Figure 3:
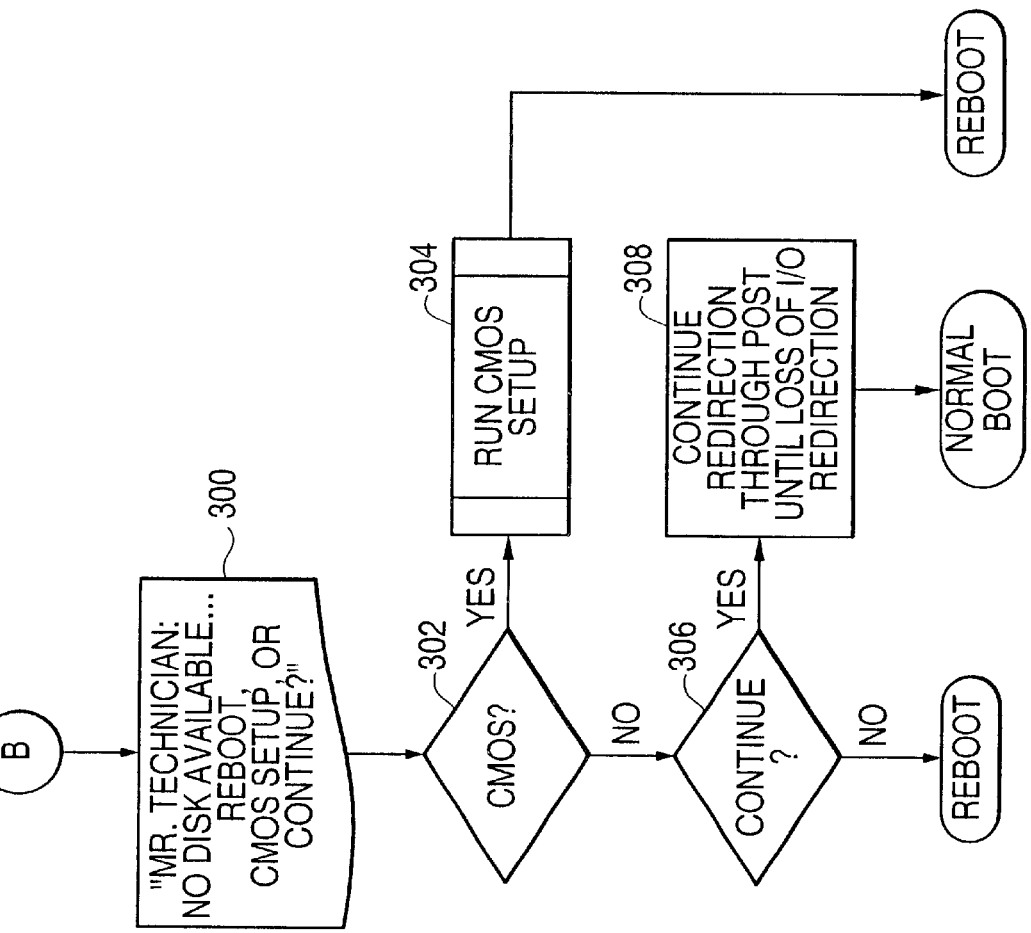

If the result of step 128 is a determination that no disk is available, program B is initiated (see FIG. 3). In this case, a display is first provided in step 300 to the remote technician, informing them that a disk is not available, and prompting for whether the technician wishes to attempt a reboot, do a CMOS setup or continue with the current boot attempt. In step 302, it is checked whether a CMOS setup has been ordered by the technician. If so, the CMOS setup is run in step 304. A CMOS setup may be selected to allow the remote technician to modify system and BIOS settings, which may enable a subsequent boot attempt to be successful. The system then reboots after the CMOS setup to see if a normal boot can be achieved.

If the technician does not order a CMOS setup, the program checks in step 306 to see if the technician has ordered the system to continue redirection through the POST operation. If so, step 308 continues the redirection through the POST process until loss of I/O redirection. Following this, a normal boot can be carried out. On the other hand, if the technician does not order the system to continue in step 306, the system will reboot.

From the above description, it can be seen that the present invention operates to utilize information regarding POST errors found in an earlier boot attempt to help achieve diagnosis, repair and, ultimately, a normal boot in a subsequent boot attempt. In particular, whenever a POST error is encountered, a POST error flag is set which particularly identifies the nature of the POST error. For example, a hardware integral timer can be used to determine how far the boot operation has progressed at the end of a predetermined time. The information as to the state of the boot process when the preset time interval expires can then be used in the reboot operation for diagnosing and carrying out remote repairs.

The software to carry out the operation of FIGS. 1–4 can be contained mostly in flash memory on the motherboard of the processor, and can operate without the presence of an operating system. Part of the software can be resident on a hidden disk partition, and is also OS-absent software.

In the past, support technicians typically had to direct the end-user over a telephone to use a diagnostic procedure and report the results to the service technician. At the processor itself, the diagnosis procedures are cryptic and unfriendly when the operating system will not boot. By using the present invention, a much friendlier environment is provided for diagnosis of the problem, especially for novice users.

Figure 5:
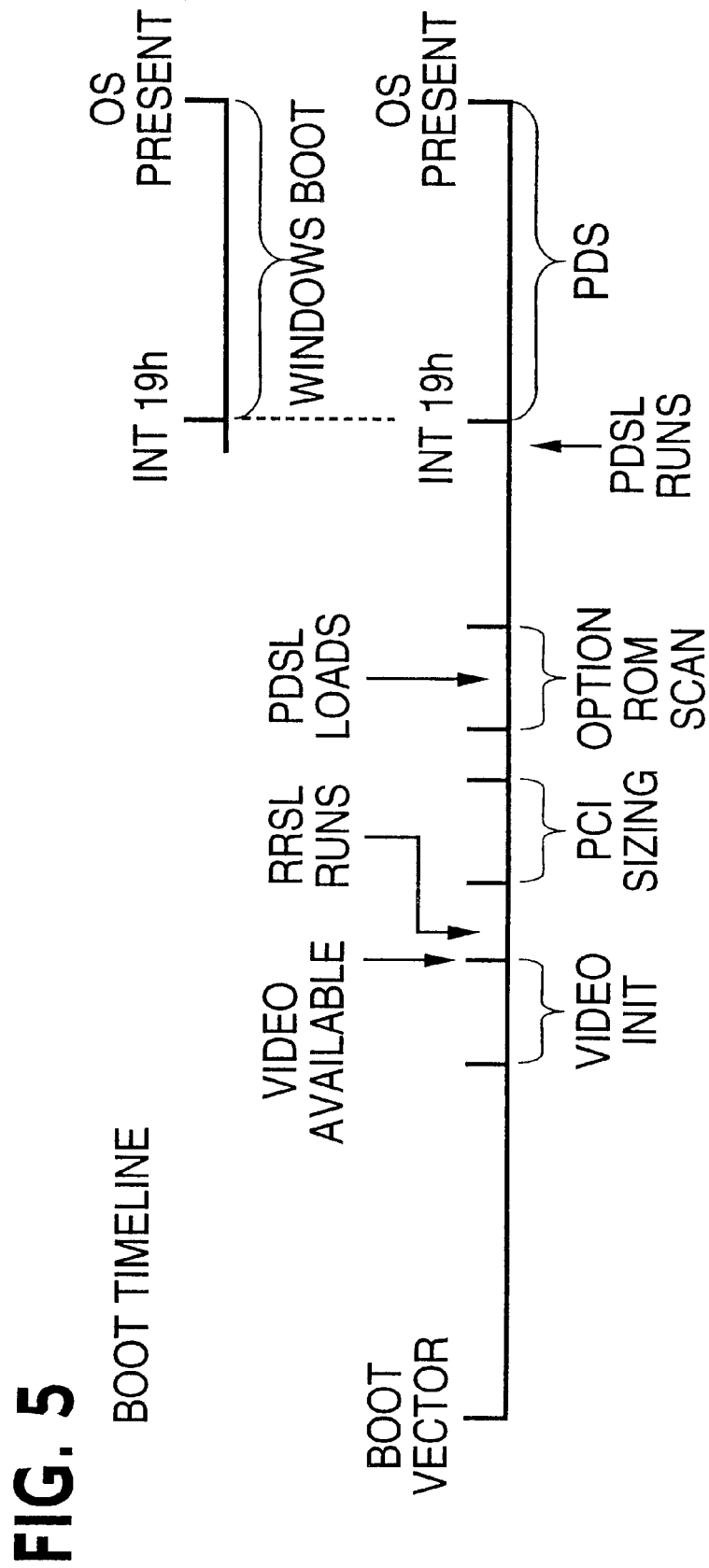
FIG. 5 shows a boot timeline which can be used in the present invention.

FIG. 5 shows a timeline for the PC host processor in accordance with the present invention. As will be discussed below, this timeline serves to implement the self-diagnosis and remote repair operations described above with reference to FIGS. 1–4.

Referring to FIG. 5, the acronym RRSL stands for the Remote Repair System Loader. This is a software component corresponding to software which can be used to initiate a remote diagnostic session in the process disclosed in previously mentioned Ser. No. 09/221,575. But this component can also be used to enhance the diagnostic capability of the system in accordance with the present invention. The acronym PDS stands for the Pre-boot Diagnostic System. This is an OS-absent diagnostic mode which the system BIOS may activate in the event of numerous failure events. As such, it is designed to be an int 19h bootable entity. The acronym PDSL stands for the Pre-boot Diagnostic System Loader. This is code which detects failure conditions independent of the BIOS and starts the PDS. The RRSL and PDSL can both be used in the operation of the invention discussed above with reference to FIGS. 1–4.

Early in the boot process, the system is in a very primitive state, while it is initializing the CPU, memory, and attempting to get the video subsystem initialized. In this basic state, there is not much system capability available to report errors and diagnostic information. The traditional method for reporting errors in this mode is for the computer to emit a pattern of beeps from the system speaker. This combination of long and short "beep codes" is a good example of a very cryptic diagnostic method.

As shown in FIG. 5, approximately in the middle of the boot process, the video subsystem is initialized. From this point forward, the video display should be available. If it is, the video subsystem can now be used to display diagnostic information. However, current practice with PC systems is to continue to assume that nothing in the system works, and continue to use the beep codes. In the present invention, a refinement has been made to the boot process, where information about the state of the boot process is made available as part of the video display, in supplement to the beep codes for a technician to diagnose and repair the PC using, for example, the RRSL and PDS components.

One very beneficial piece of information in diagnosing a failure is to know exactly what progress has been made in the boot process. This information is commonly referred to as a "POST code", where POST stands for "Power On Self Test". The POST code is changed by the BIOS as it progresses through the system initialization process, and is written out to I/O port 80 h. Although the POST code provides useful insight into the status of the boot process, it is normally not available to a technician unless a special PCI card is used on the system (a so-called "POST" card). The cost of providing this card is too high to include it as a standard part of every system. But if there are enough system facilities available in the boot process, it is possible to simulate a POST card's function by using the host CPU and the video subsystem in accordance with the present invention to display the POST code. This permits the user or technician to monitor the progress of the boot process and use this information to diagnose and/or repair the system.

An exemplary application of using the present invention for diagnosis and repair of problems in Peripheral Component Interface (PCI) resource allocation (hereinafter referred to as PCI Sizing) during the boot process will now be discussed.

Referring to FIG. 5, it can be seen that the majority of PCI Sizing occurs after the video subsystem is available. This is intentional in the design of the PC boot process, in order to make visual information available to the user as quickly as possible. But often during PCI Sizing, an error will occur with one of the cards, and the POST process will fail and stop.

In the application of the present invention, the BIOS can use a hardware interval timer built in to the south bridge of an Intel chipset (for example, the 810 and 820 chipsets) to determine whether a failure occurs and the status of the boot process at the time the timer expires. If this timer expires, it will generate a non-maskable interrupt such as a System Management Interrupt (SMI). Should such an event occur, the system will save information about the state of the boot process (such as the POST code) in non-volatile memory, and reboot the computer.

When the computer reboots, the BIOS detects that a previous unsuccessful attempt was made to boot and a diagnosis mode should be entered. Note in the timeline shown in FIG. 5, the component RRSL (for the Remote Repair System Loader) is started just after the video subsystem is initialized. Part of the responsibility of this component is to detect if a previous unsuccessful boot attempt occurred in the PCI Sizing area. If such an error occurred, the system can now print out additional diagnostic information about PCI resources. This information will enable a technician to quickly identify whether the failed component is the PCI card or slot, and which slot is at fault. In another application of this invention, the POST code itself provides useful information, and if the video subsystem is available, it can also be displayed during the diagnostic boot mode, thus enabling the technician to understand the cause of the boot failure. As also shown in FIG. 5, the system contains a self-diagnosis boot mode, called the Pre-boot Diagnostic System (PDS) which runs as a bootable entity in place of Windows for further diagnosis. This PDS can be run as the self-diagnosis operation discussed previously with regard to FIGS. 1–4.

Next, another feature of the present invention will be discussed. Specifically, in order to implement the present invention as discussed with regard to FIGS. 1–4, the end-user can call a technician at a remote location for support using a voice telephone. The technician can then instruct the user to initiate a diagnostic mode using a keystroke combination, and the interconnection can be made using the telephone.

In implementing this technology, a fundamental problem is created, specifically, how does one associate an end-user's voice phone call with the Internet connection made by the computer? The modem connection is generally through a remote ISP and, in any case, is through an analog modem connection, whereas the voice call is through a digital PBX to the support provider. When the computer connects using the Internet, the IP address of the computer has been assigned by the user's ISP and will not be known a priori by the support provider.

In order to solve this problem, a novel use is made of the LDAP protocol to achieve this rendezvous. LDAP stands for the Lightweight Directory Access Protocol, which is an internet standard supported by the Internet Engineering Task Force (IETF). The protocol is a way for clients to register information about themselves in a database, and then for other clients to access that data. The protocol is normally used by systems such as VideoPhone to find out who is on the Internet and able to receive a VideoPhone call. But in the present invention, a small LDAP database is used which is local to the support provider. After the computer connects to the Internet and receives an IP address from the Internet Service Provider (ISP) using Point-to-Point Protocol (PPP), the system will publish its new IP address and the system serial number to the LDAP database. The serial number is obtained from flash memory (from the SMBIOS area) and the IP address is obtained from the ISP.

The technician servicing the call can ask for the user's system serial number over the voice phone call and launch an application which queries the LDAP database for the appearance of the serial number. Once the client has connected to the Internet and registered with the LDAP database, the technician's query to the LDAP database will succeed and they now have an Internet address to use to take over the user's computer and repair it. Other rendezvous information can be obtained from the user, such as their name or telephone number, but the serial number is adequate for this invention to be effective.

Figure 6:
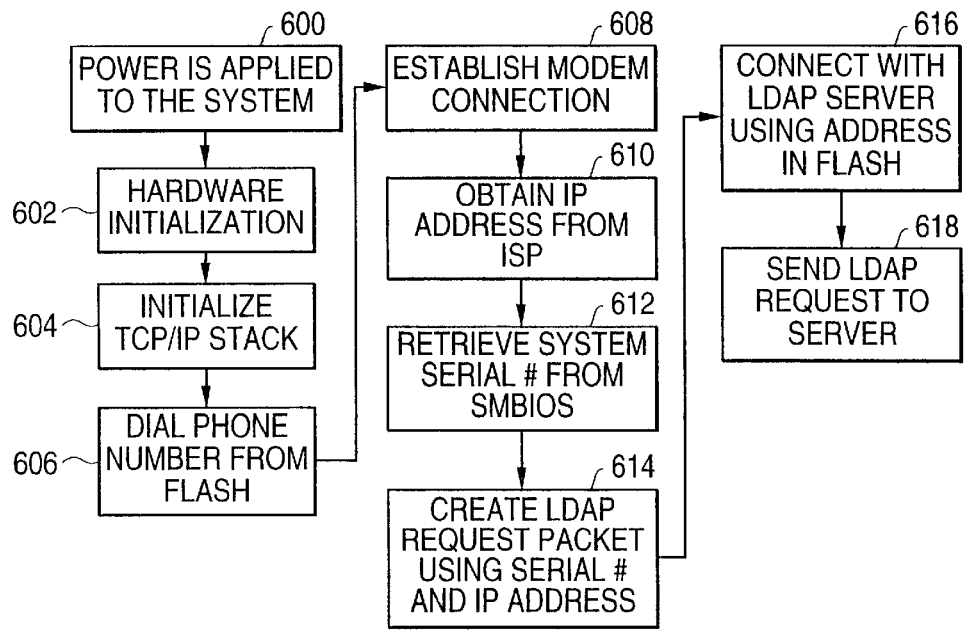
FIG. 6 is a flowchart showing steps taken at a user processor to permit connection to a remote diagnostic location in accordance with the present invention.

Referring to FIG. 6, a flowchart is shown of the operation at the user processor for implementing the diagnostic connection with the remote service location. It is assumed that the user has already experienced difficulty in the boot process, has called the remote service location with a voice call, and, after powering on, has operated a hot key combination or requested remote connection in some other manner.

After power-on (step 600), hardware initiation is performed in step 602 and the TCP/IP stack is initialized (step 604). At this point, the processor will dial the telephone number of the remote location using a telephone number stored in a non-volatile memory (step 606) to establish a mode of connection with the remote location (step 608). Next, in step 610, the processor will receive an IP address from the remote location (e.g., an ISP). In step 612, the processor will retrieve identifying information regarding itself, for example, the serial number, from a non-volatile memory, for example, the System Management BIOS (SMBIOS). Armed with the IP number and the serial number, the processor will then create a LDAP request package in step 614. This request package is then used in step 616 and step 618 to connect the processor with the LDAP server using an address stored in a non-volatile memory (e.g., a flash memory), and send the information regarding the IP address and the serial number to the LDAP server. The LDAP server will then add the necessary information to permit identification of the processor from the LDAP.

Figure 7:
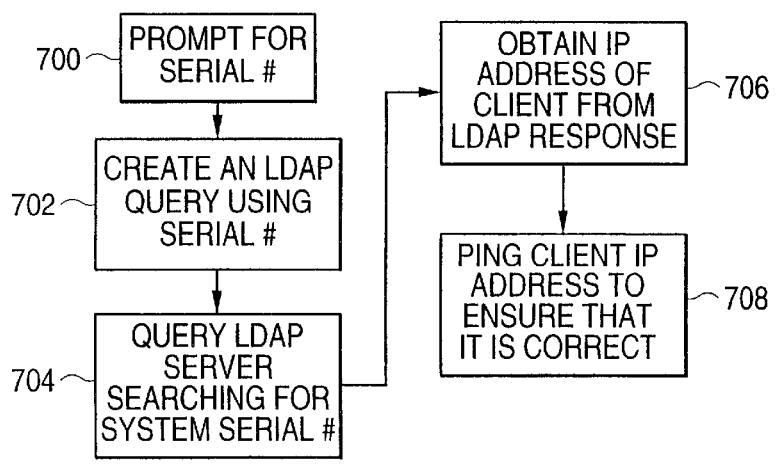
FIG. 7 is a flowchart showing steps at a remote diagnostic location to permit connection to a user processor in accordance with the present invention.

FIG. 7 shows the operation from the remote service location to permit a correlation between the voice call from the user and the network connection once the operation of FIG. 6 has been carried out. In step 700, the remote processor will prompt the serial number of the user (obtained, for example, by the technician from the user in the voice call). The remote processor then creates an LDAP query using the user processor's serial number (step 702), and queries the LDAP server to search for the serial number (step 704). Once the remote processor locates the processor serial number in the LDAP, it can obtain the IP address of the user in step 706. The remote processor will then ping the client IP address to ensure that it is correct (step 708). Once the remote processor verifies the user processor's IP address, it can then correlate the voice call from the user with its network connection, and the remote diagnosis can begin.

Figure 8:
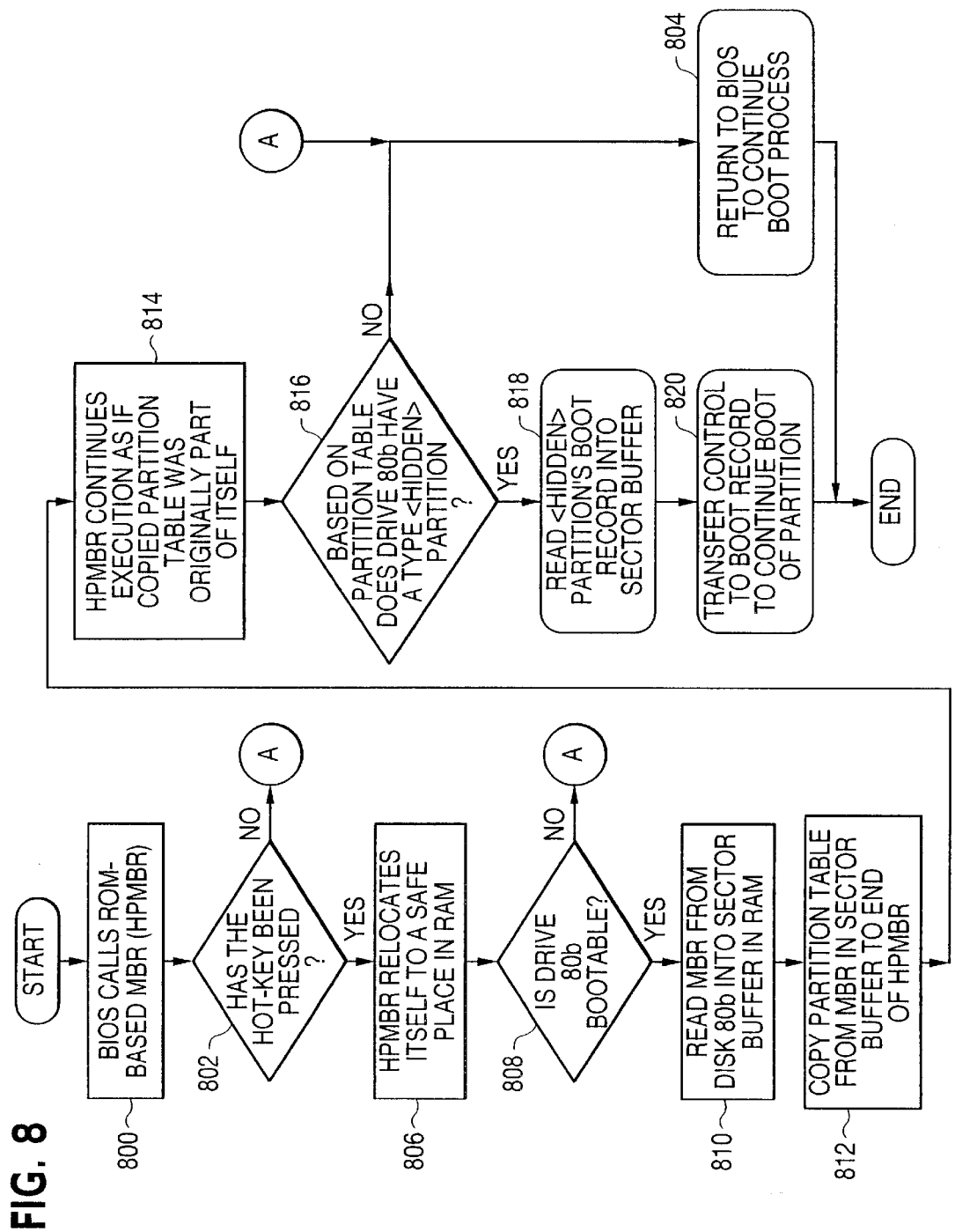
FIG. 8 is a flowchart showing steps to permit booting of a diagnostic operation, in spite of corruption of the boot disk of the processor, in accordance with the present invention.

FIG. 8 shows another aspect of the present invention, specifically a flowchart of steps to permit booting a diagnostic operation which is shown in FIGS. 1–4 in spite of corruption of the boot disk of the processor.

In general, a disk with many types of disk corruption can still be successfully booted into an OS, and the tools in that OS can be used to repair the corruption. However, the PC architecture is very susceptible to one type of corruption which will prevent the PC from booting into an OS. This is the first few bytes of the Master Boot Record (MBR) of the boot disk. This type of corruption is quite common, particularly with systems booting multiple OS's (such as Windows and Linux or Be OS). This invention prevents this corruption from causing a failure.

The PC's boot process reads the first sectors of the disk, known as the MBR and uses this data in two ways: there is binary code in the MBR which is run on the host processor and there is a partition table. The binary code is a boot loader which describes how to access the partition table and continue the boot process to the next step. However, if this code has been corrupted, the remainder of the disk may be free of defects, but an OS will be unable to boot. FIG. 8 shows a method to avoid this problem in conjunction with the foregoing disclosure.

Specifically, using the method shown in FIGS. 1–4, and the timeline shown in FIG. 5, a bootable object such as the PDSL (Pre-boot Diagnostic System Loader) can read the MBR information and extract the partition table, but replace the MBR's boot loader with a version of the boot loader stored in the PDSL. This takes advantage of a feature in standard IA-32 BIOS code which enables a list of bootable devices to be supported. Commonly, this list contains such devices as the floppy disk, hard disk, CD-ROM and network. In accordance with the present invention, the bootable object is inserted as the last item in the boot list. Thus, if the MBR has been corrupted, the PC will be unable to boot from the hard disk and will fall through to the PDSL. Once the PDSL has been booted, it ignores the boot loader in the MBR and uses its own boot loader to boot a diagnostic partition. Once the diagnostic partition has been booted, code within the partition can be used to repair the MBR, and a normal boot can thus take place.

In order to carry out this process, the PDSL has the following general algorithm:

1) Report that no bootable devices are available and that a diagnostic boot will be attempted;
2) Read the MBR from the primary boot disk;
3) Extract the partition table (the corrupted boot loader is discarded);
4) Merge the partition information with the internal version of the MBR; and
5) Load the merged MBR and execute. Referring to FIG. 8, in step 800, the processor BIOS calls the ROM-based Hidden Partition MBR (HPMBR). The processor then checks to see if a hot key has been pressed in step 802. If no hot key has been pressed, program A is run to return to the BIOS to continue the boot process (step 804). On the other hand, if a hot key has been pressed, the HPMBR will relocate itself to a safe place in the RAM in step 806. In step 808, the processor determines if the drive 80$h$ is bootable. If not, program A is again executed by returning to BIOS to continue the boot process. On the other hand, if drive 80$h$ is bootable, the MBR from disk 80$h$ is copied into a sector buffer in the RAM in step 810. Following this, the partition table from the MBR is copied into the sector buffer to the end of HPMBR in step 812.

In step 814, the HPMBR continues execution by operating as if the copied partition table was an original part of itself. In step 816, the question is asked, based on the partition table, as to whether the drive 80$h$ has a type <hidden> partition. If the answer is no, program A is run, returning to BIOS to continue the boot process (step 804). On the other hand, if the answer to the question in step 816 is yes, the <hidden> partition's boot record is read into the sector buffer. At this point, control to the boot record is transferred to continue boot operation of the partition. Using the above-noted operation, the system can successfully boot even with an MPR corruption problem.

The invention may be embodied in other specific forms without departing from the spirit or essential characteristics thereof. The present embodiments are therefore to be considered in all respects as illustrative and not restrictive. For example, although the present invention has been described with regard to an OS absent environment (in which it is extremely useful), the connection, diagnosis and repair operations described herein could also be run after a successful system boot if desired, for example, in a situation where other problems are encountered even though the system has booted successfully.

We claim:

1. A method for providing diagnosis of a computer system comprising:

beginning a boot operation of the computer system and running a Power-On Self Test (POST) process;

detecting a failure in the POST process;

storing information regarding the failure in the POST process;

rebooting to run the POST process again;

using stored information regarding the failure in the POST process for diagnosis;

connecting to a remote location for diagnosis after rebooting wherein connection to the remote location includes:

loading pre-boot services into a volatile memory from a non-volatile memory, wherein the pre-boot services include code for a modem driver; and using the modem driver code to establish a network connection with the remote location for diagnosis wherein the diagnosis of the computer system is performed prior to completion of an operating system boot.

2. A method according to claim 1, wherein the diagnosis is a self-diagnosis.

3. A method according to claim 1, wherein the information about the POST failure is stored in a non-volatile memory.

4. A method according to claim 3, wherein the nonvolatile memory comprises a flash memory.

5. A method according to claim 1, wherein the failure in the POST process includes problems in Peripheral Component Interconnect (PCI) sizing.

6. A method according to claim 1, wherein the stored information regarding the failure in the POST process includes information as to a status of the boot operation at the time of the failure in the POST process.

7. A method according to claim 6, further comprising providing a visual display of information as to the status of the boot operation at the time of the failure in the POST process during rebooting.

8. A method according to claim 1, wherein the failure in the POST process is detected by determining if the POST process is completed within a predetermined time.

9. A method according to claim 8, wherein the stored information regarding the failure in the POST process includes a status of the boot operation at an expiration of the predetermined time.

10. A system comprising:
- a memory to store instructions to perform a boot process and a Power-On Self-Test (POST) operation; and
- a processor to execute the instructions stored in the memory to perform the following:
  - begin the boot process and run the Power-On Self Test (POST) operation;
  - detect a failure in the POST operation;
  - store information regarding the failure in the POST operation;
  - reboot and run the POST operation again;
  - utilize stored information regarding the failure in the POST operation for diagnosis during reboot;
  - connect to a remote location for diagnosis after rebooting wherein said processor is to:
    - load pre-boot services into a volatile memory from a non-volatile memory, wherein the pre-boot services include code for a modem driver; and
    - use the modem driver code to establish a network connection with the remote location for diagnosis wherein the diagnosis of the computer system is performed prior to completion of an operating system boot.

11. A machine readable medium having embodied thereon a program for execution by a computer system for providing diagnosis of the computer system, the program comprising:
- beginning a boot operation of the computer system and running a Power-On Self Test (POST) process;
- detecting a failure in the POST process;
- storing information about the failure in the POST process;
- rebooting to run the POST process again;
- using stored information of the failure in the POST process for diagnosis;
- connecting to a remote location for diagnosis after rebooting wherein connection to the remote location includes:
- loading pre-boot services into a volatile memory from a non-volatile memory, wherein the pre-boot services include code for a modem driver; and
- using the modem driver code to establish a network connection with the remote location for diagnosis, wherein the diagnosis of the computer system is performed prior to completion of an operating system boot.

* * * * *